(12) United States Patent
Ning et al.

(10) Patent No.: US 8,855,085 B2
(45) Date of Patent: Oct. 7, 2014

(54) WIRELESS LOCAL AREA NETWORK HANDOVER METHOD BASED ON FUZZY RULES

(75) Inventors: Bin Ning, Beijing (CN); Hongwei Wang, Beijing (CN); Hailin Jiang, Beijing (CN); Bing Bu, Beijing (CN)

(73) Assignee: Beijing Jiaotong University, Beijing (CN)

( * ) Notice: Subject to any disclaimer, the term of this patent is extended or adjusted under 35 U.S.C. 154(b) by 0 days.

(21) Appl. No.: 13/816,224

(22) PCT Filed: Sep. 1, 2011

(86) PCT No.: PCT/CN2011/001486
§ 371 (c)(1),
(2), (4) Date: May 14, 2013

(87) PCT Pub. No.: WO2012/088744
PCT Pub. Date: Jul. 5, 2012

(65) Prior Publication Data
US 2013/0272264 A1    Oct. 17, 2013

(30) Foreign Application Priority Data
Dec. 28, 2010  (CN) .......................... 2010 1 0622552

(51) Int. Cl.
H04W 4/00   (2009.01)
H04W 36/00  (2009.01)
H04W 36/24  (2009.01)
H04W 12/06  (2009.01)
H04W 84/00  (2009.01)
H04W 36/08  (2009.01)

(52) U.S. Cl.
CPC .............. *H04W 36/24* (2013.01); *H04W 12/06* (2013.01); *H04W 84/005* (2013.01); *H04W 36/0083* (2013.01); *H04W 36/08* (2013.01)
USPC ........................................................ 370/332

(58) Field of Classification Search
USPC ............................. 370/329, 331, 332; 455/436
See application file for complete search history.

(56) References Cited

U.S. PATENT DOCUMENTS 5,633,888 A * 5/1997 Stewart .......................... 375/132
6,141,553 A * 10/2000 Fernandez et al. ............. 455/436
(Continued)

FOREIGN PATENT DOCUMENTS

| CN | 1889776 A | 1/2007 |
| CN | 1897757 A | 1/2007 |

(Continued)

OTHER PUBLICATIONS

PCT International Search Report for PCT Counterpart Application No. PCT/CN2011/001486, 7 pgs., (Dec. 8, 2011).

(Continued)

*Primary Examiner* — Edan Orgad
*Assistant Examiner* — Saumit Shah
(74) *Attorney, Agent, or Firm* — Blakely, Sokoloff, Taylor & Zafman LLP (57) ABSTRACT

A Wireless Local Area Network (WLAN) handover method is provided. The method comprises a mobile station receiving probe frames sent in a predefined time interval from a current associated access point and an adjacent access point during a preset time period. The station obtains and stores a signal strength for each access point based on the beacon frames. The station performs fuzzy processing of the signal strengths and change rates of the signal strengths to obtain fuzzy data characterizing levels of the signal strengths and the change rates. The station performs fuzzy reasoning based on the fuzzy data to obtain reasoning outputs. A target access point is determined by the station based on the reasoning outputs. The station authenticates with the target access point, and sends a re-association request frame to the target access point. Re-association is established after a re-association response frame is received by the station.

9 Claims, 5 Drawing Sheets

(56) References Cited

U.S. PATENT DOCUMENTS

2002/0068568 A1    6/2002    Qing-An
2007/0025296 A1*    2/2007    Jung et al. .................... 370/331

FOREIGN PATENT DOCUMENTS

| CN | 101483894 A | 7/2009 |
|---|---|---|
| CN | 101511111 A | 8/2009 |
| CN | 101841878 A | 9/2010 |
| CN | 102045720 A | 5/2011 |

OTHER PUBLICATIONS

First Office Action for Chinese Patent Application No. 201010622552.8, 5 pgs., (Aug. 10, 2012).
Written Opinion of the International Search Authority, PCT Application No. PCT/CN2011/001486; dated Aug. 12, 2011; 7 pages.
International Preliminary Report on Patentability, PCT Application No. PCT/CN2011/001486; dated Jul. 2, 2013; 8 pages.

* cited by examiner

WIRELESS LOCAL AREA NETWORK HANDOVER METHOD BASED ON FUZZY RULES

CROSS-REFERENCE TO RELATED APPLICATIONS

This patent application is a U.S. National Phase Application under 35 U.S.C. §371 of International Application No. PCT/CN2011/001486, filed Sep. 1, 2011, entitled A WIRELESS LOCAL AREA NETWORK HANDOVER METHOD BASED ON FUZZY RULES, which claims priority to Chinese Patent Application No. 201010622552.8, filed Dec. 28, 2010.

TECHNICAL FIELD

The present invention relates to data transmission technology and in particular to a wireless local area network handover method based on fuzzy rules.

BACKGROUND ART

With the rapid development of the wireless technology, the wireless network, in particular WLAN (Wireless Local Area Network) based on IEEE802.11 standard protocol has been widely used. But its service coverage area is limited due to limitation of WLAN power. When the mobile station leaves the current AP (Access Point) coverage area or loses contact with it, it must disconnect current association and re-associate with another AP, resulting in the phenomenon of handover.

IEEE802.11 standard mainly defines the specifications of physical layer and medium access control layer of wireless local area network transmission, but it does not specifies how mobile station or terminal handovers among wireless APs. However, the standard specifies the processes for synchronization, authentication, association and re-association. According to the protocol, the handover process of the wireless local area network consists of the following three phases:

Scanning Phase

The scanning phase is started when the received signal strength of the mobile station is lower than the scanning threshold.

The scanning phase is divided into two modes: passive scanning and active scanning Wherein, the terminal detects whether there are beacon frames in the wireless LAN channel successively under the passive scanning mode, the beacon frames are usually sent by a period around 100 ms. The terminal accomplishes synchronization with the AP according to parameters of the received beacon frames.

Under the active scanning mode, the mobile station takes the initiative to send a probe request frame to verify whether there is AP on the certain channel. The AP would send a probe response frame to the mobile station after receiving the probe request frame. The mobile station accomplishes synchronization with the AP according to parameters of the detect response frame.

The advantage of passive scanning phase is saving power; the disadvantage is long scanning delay. The active scanning is reverse. In actual wireless LAN network, the active scanning phase is usually used for handover.

Authentication Phase

In the authentication phase, the mobile station authenticates with the optimal AP found in the previous phase. Generally, the mobile station immediately authenticates with the new AP after the end of the scanning period, the phase is initiated when the mobile station sends authentication request and completed when the mobile station receives authentication response sent by the new AP.

Re-association Phase

Once the authentication of the mobile station with the new AP is completed, re-association phase is carried out immediately. As same as authentication phase, the re-association phase is initiated when the mobile station sends re-association request and completed when the mobile station receives re-association response sent by the new AP.

It can be seen from above description, the handover delay is mainly affected by the scanning delay (passive scanning mode) or the detect delay (active scanning mode) of the scanning phase.

Train-ground Communication in Urban Rail Transit

The CBTC (Communication-Based Train Control) system, which is key to control train operation, is not allowed system failure in any condition. As CBTC system is safety-critical, it requires high reliability, high dependability and high safety. Most current CBTC systems usually adopts wireless LAN technology as the main method of train-ground communication, which works at 2.4 GHz frequency.

The performance of the wireless LAN has been the bottleneck of the train-ground communication system in CBTC due to the high bandwidth and maturity of the wire Ethernet technology, of which the most important parameter is the data packet loss rate and delay. According to IEEE 1474.1 (2004) standard, the delay of the train-ground communication and ground-train communication should not exceed 0.5~2 seconds, otherwise the emergency brake of the train will be initiated. The field test results indicate that the interruption time of the handover between different access points is the most crucial factor affecting the packet loss rate and delay time in train-ground communication.

Generally speaking, the handover trigger condition is related with one parameter about signal quality that is below a specific threshold. Since rail transportation is a way of one dimension, the train-ground communication also has the characteristic of one dimension. In other words, the access points are arranged along the rail line, and information exchange between the mobile station and access points is conducted within the coverage of each access point. In current train-ground communication of CBTC, there are several types of propagation medium coexisting, including free space, leaky waveguide and leaky coaxial cable, in particular, the free space is the main propagation medium, supplemented by leaky waveguide.

Figure 1:
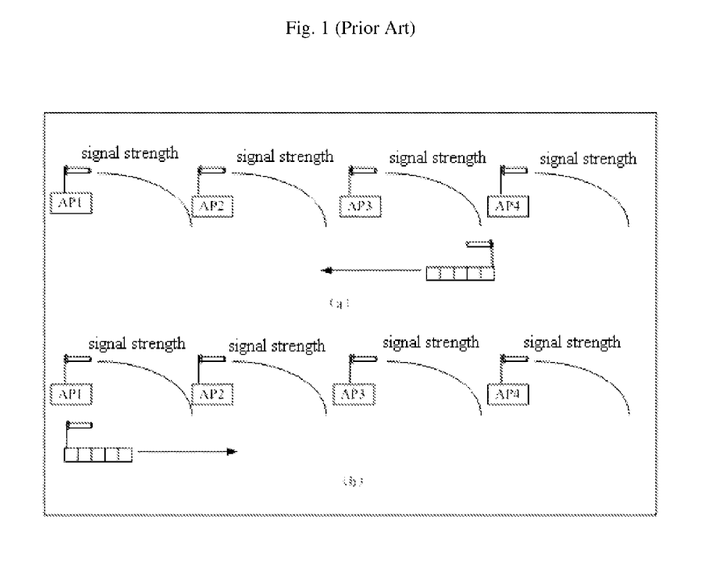
FIG. 1 is a schematic diagram of signal coverage in CBTC train-ground communication with free space as the propagation medium, using directional antenna.

When the propagation medium is free space, the antenna of the mobile station and sidetrack AP (access point) usually use directional antenna in order to achieve the best performance of the train-ground communication. As shown in FIG. 1, when mobile station runs in different directions, the signal strength it receives within the coverage area changes in different ways, thus there will be different impacts on handover performance. In FIG. 1 (a), with the moving of the mobile station, the signal strength of the current access point within the coverage area is getting stronger. When the handover happens, the signal strength of the current access point changes from the strongest to the weakest, and the adjacent AP signal is also very weak. The handover in this case is very unsatisfactory, mainly because the signal strength enters the scanning threshold suddenly but not progressively reaches. Also because the signal strength of the adjacent access point is very weak, thus the mobile station is unable to find a suitable access point at the scanning phase, resulting the prolonging of the scanning time, and the handover time also gets longer. The situation of FIG. 1 (b) is more in line with the normal handover phenomenon, the signal strength of the current access point is gradually weakening, and the signal strength of the adjacent access point becomes strongest during the handover, so the handover will occur normally with ideal effect.

Figure 2:
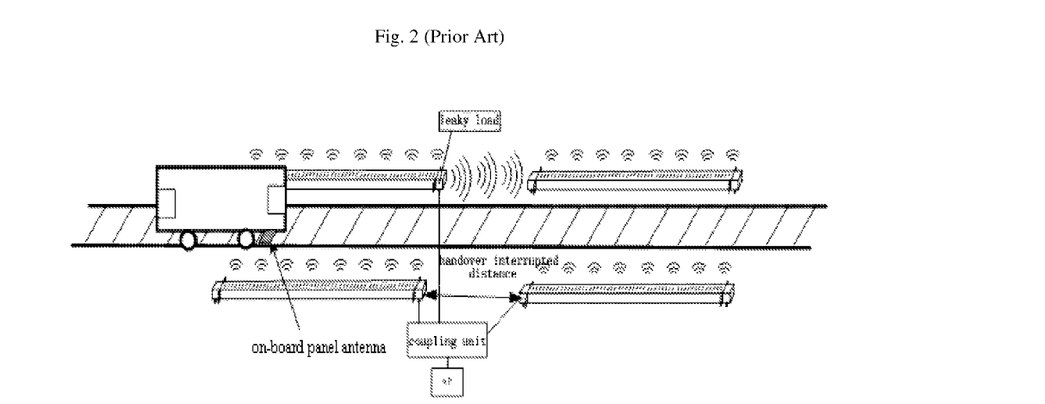
FIG. 2 is a schematic diagram of signal coverage in CBTC train-ground communication with leaky waveguide as the propagation medium.

Similarly, there is same phenomenon when leaky waveguide is applied as the main propagation medium. During the phase, the leaky waveguide sends signals from the slots at the wide wall of leaky waveguide, and the mobile station receives signals with a panel antenna; conversely, the signal which is sent from the mobile station using panel antenna can be coupled to the leaky waveguide through the slots. FIG. 2 shows the installation of leaky waveguide along rail tracks, and there is about one meter between the two ends of the waveguides, where the signal strength is low and the communication may be interrupted. In order to have a better handover effect, and increase the coverage area of the wireless signal, the matched load at the end of leaky waveguide is often a leaky load. And the guided wave can be radiated to the free space through the short circuit plate. Therefore the communication interrupted distance is effectively reduced or even eliminated. However, there will be a relatively good handover effect, as same as the free space transmission medium using directional antenna, and when facing the radiation direction of the leakage load; on the contrary, the handover effect is not ideal.

The fundamental reason is the single handover mechanism, which cannot adapt to different handover circumstances.

SUMMARY

The technical problem to be solved by the present invention is how to overcome the defects of single handover mechanism and the handover delay caused by scanning delay, as presented in the present wireless LAN handover method, so as to improve the handover performance of the wireless LAN.

To solve the above technical problem, the technical solution of the present invention proposes a wireless local area network handover method based on fuzzy rules, which is shown as follows:

S1: the mobile station receives the beacon frames sent in predefined time interval from the current associated access point and the adjacent access point during a preset time period, then it obtains and stores signal strength of two access points;

S2: the mobile station performs fuzzy processing of the value of signal strength of the current access point, the value of signal strength of the adjacent access point, the change rate of signal strength of the current access point during the preset time period, the change rate of signal strength of the adjacent access point during the preset time period respectively via fuzzy control method, and obtains fuzzy data which characterizes the levels of signal strength and change rate of signal strength;

S3: the mobile station performs fuzzy reasoning taking the fuzzy data above as the input variable according to preset fuzzy rules, and obtains the reasoning output variables which contain handover modes of the mobile station, and determine the target access point according to the aforesaid reasoning outputs;

S4: the mobile station authenticates with the target access point;

S5: the mobile station sends the re-association request frame to the target access point after passing through the authentication; the handover is completed when establishment of the re-association is finished after the mobile station receives the re-association response frame.

Moreover, the step S2 further comprises: the mobile station identifies the level of signal strength of the current access point, the level of signal strength of the adjacent access point, the level of the change rate of signal strength of the current access point during the preset time period, the level of the change rate of signal strength of the adjacent access point during the preset time period as different levels respectively, via the first membership function.

Wherein, the first membership function is:

$$\mathrm{trapezoid}(x; a, b, c, d) = \begin{cases} 0 & x \leq a \\ \dfrac{x-a}{b-a} & a \leq x \leq b \\ 1 & b \leq x \leq c \\ \dfrac{d-x}{d-c} & c \leq x \leq d \\ 0 & d \leq x \end{cases}$$

wherein, for the value of signal intensity, x is an independent variable meaning the range of signal strength; for the change rate of signal strength, x is an independent variable meaning the range of change rate of signal strength; wherein, the aforesaid levels are determined by the value of a, b, c, d.

Wherein, the fuzzy reasoning output is discrete.

Further, the reasoning output in step S3 comprises:
selecting target access point through active scanning; or,
skipping the scanning stage and directly selects the adjacent access point as the target access point; or,
maintaining the current status.

Further, the preset fuzzy rules comprise: determining the handover mode of the mobile station through a second membership function; the second membership function is:

$$\mathrm{triangle}(x, r, s, t) = \begin{cases} 0 & x \leq r \\ \dfrac{x-r}{s-r} & r \leq x \leq s \\ \dfrac{t-x}{t-s} & s \leq x \leq t \\ 0 & t \leq x \end{cases}$$

wherein, x is an independent variable; wherein, the handover mode may be determined by the value of r, s, t.

DETAILED DESCRIPTION

Hereinafter, the wireless local area network handover method based on fuzzy rules as provided in the present invention will be explained with reference to the accompanying drawings and embodiments.

The principal thought of the present invention is: applying fuzzy mathematics to handover mechanism, shortening the handover time and reducing the handover packet loss, via the self-adaption handover mechanism of detecting regularly for peripheral microwave environment by the mobile station. When it is detected that the change of the microwave environment is not abrupt, the mobile station maintains current status; when it is detected that the abrupt change of the microwave environment is normal, the mobile station selects a traditional handover mechanism; when it is detected that the abrupt change of the microwave environment is abnormal, the mobile station selects a special handover mechanism.

Figure 3:
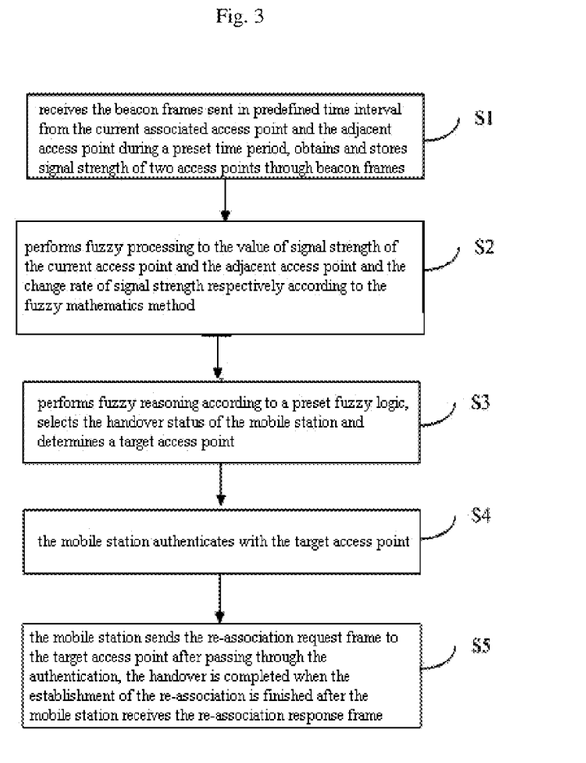
FIG. 3 is a flow chart of the wireless local area network handover method based on fuzzy rules according to the present invention.

The beacon frames are sent periodically in WLAN. In the present invention, the mobile station receives the beacon frames of the adjacent access point during designated corresponding time period, according to the AP's information pre-stored along the line. Besides, the mobile station monitors the change of the signal strength of the current access point and the adjacent (next) access point in real-time; the technical solution of the present invention includes the following steps as shown in FIG. 3:

S1: the mobile station receives and stores the signal strength of the beacon frames from the current associated access point and the adjacent access point during the preset time period;

S2: the mobile station performs fuzzy processing of the value of signal strength of the current associated access point, the value of signal strength of the adjacent access point, the change rate of signal strength of the current associated access point during the preset time period, the change rate of signal strength of the adjacent access point respectively during the preset time period by fuzzy control method;

in this step, the fuzzy processing includes: dividing the signal strength into low level, medium level, high level; dividing the change rate of signal intensity into plummeting level, steady level, leap level, and establishing the corresponding membership functions.

S3: the mobile station performs fuzzy reasoning according to the preset fuzzy rules, selects the handover status (normal handover, abnormal handover and maintain current status) of the mobile station and determines a target access point according to the selected handover status;

for normal and non-abrupt signal change, the mobile station maintains current status;

for normal abrupt signal change, the mobile station selects normal handover mechanism;

for abnormal abrupt signal change, the mobile station selects abnormal handover mechanism;

S4: the mobile station authenticates with the target access point;

S5: the handover is completed after the target access point responds to the authentication request and the association request of the mobile station one by one.

Figure 4:
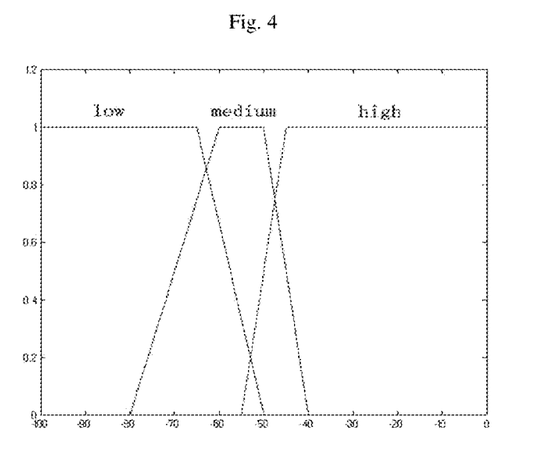
FIG. 4 is a schematic diagram of fuzzification results of signal strength on the basis of the wireless local area network handover method based on fuzzy rules according to the present invention.
Figure 5:
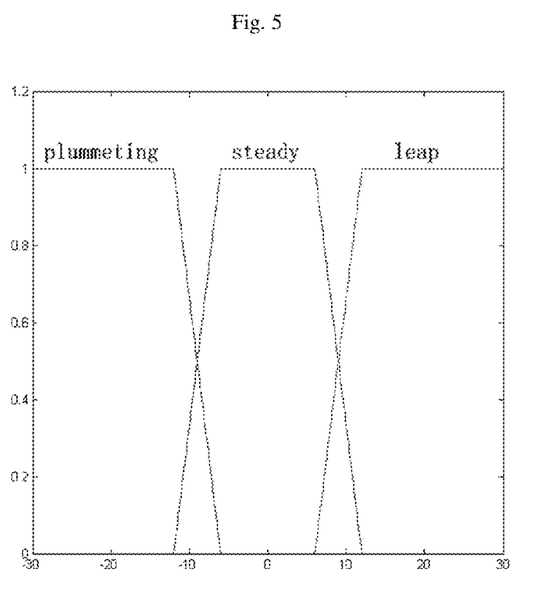
FIG. 5 is a schematic diagram of fuzzification results of the change of the signal strength on the basis of the wireless local area network handover method based on fuzzy rules according to the present invention.

Hereinafter, the steps S1-S5 will be explained in more detail with reference to specific embodiments. According to the technical solution of the present invention, the mobile station obtains the signal strength RSSI of the current access point and the adjacent access point by analyzing beacon frames; the regularity of the change of signal strength RSSI of the current and the adjacent access point can be obtained, after storing the signal strength within a certain time period. The specific steps are as follows:

assume that beacon frames are sent in a period of time T, then the mobile station receives the beacon frame of the current access point at t1, the beacon frame of the adjacent access point at t2 and obtains the signal strength RSSI of the two access points respectively and stores them, these parameters are marked as P1, P2;

the mobile station receives the next beacon frame of the current access point at t1+T, and receives the next beacon frame of the adjacent access point at t2+T, then obtains signal strength RSSI of the two access points respectively and stores them, the signal intensities are marked as P1',P2';

the mobile station calculates the difference of the values of the signal strength in two period, delta1=P1'-P1, delta2=P2'-P2;

the mobile station performs fuzzy processing of signal strength of two access points and their change rate according to the fuzzy mathematics method; i.e. divide the signal strength RSSI into low level, medium level, high level, curves of these membership functions are shown in FIG. 4; divide change rate of signal strength into plummeting level, steady level, leap level, curves of their membership functions are shown in FIG. 5; fuzzification signal strength and fuzzification change rate are used as input variables of fuzzy reasoning.

Signal strength RSSI and change rate of signal strength have three language variables respectively, so there are six membership functions altogether. Based on experience and test, trapezoidal membership function is selected to express these six membership functions. The trapezoidal membership function is determined by four parameters $\{a, b, c, d\}$, as follows:

$$\text{trapezoid}(x; a, b, c, d) = \begin{cases} 0 & x \leq a \\ \frac{x-a}{b-a} & a \leq x \leq b \\ 1 & b \leq x \leq c \\ \frac{d-x}{d-c} & c \leq x \leq d \\ 0 & d \leq x \end{cases} \quad (1)$$

wherein, for signal strength, x is an independent variable meaning the range of signal intensity, typically −100~0dBm; for change rate of signal strength, x is an independent variable meaning the range of the change rate of the signal, typically −30~30;

table 1 shows the range of $\{a, b, c, d\}$ of these six membership functions respectively.

TABLE 1

| MF Parameters Range | Language Variables | | | | | |
|---|---|---|---|---|---|---|
| | Low (dBm) | Medium (dBm) | High (dBm) | Plummeting (dB) | Steady (dB) | Leap (dB) |
| a | [−130 −120] | [−94 −76] | [−60 −42] | [−105 −96] | [−16 −8] | [0 8] |
| b | [−104 −92] | [−72 −58] | [−52 −40] | [−60 −42] | [−8 0] | [8 14] |
| c | [−78 −58] | [−56 −48] | [−10 0] | [−16 −8] | [0 8] | [42 60] |
| d | [−56 −48] | [−46 −32] | [0 5] | [−8 0] | [8 16] | [96 104] |

Figure 6:
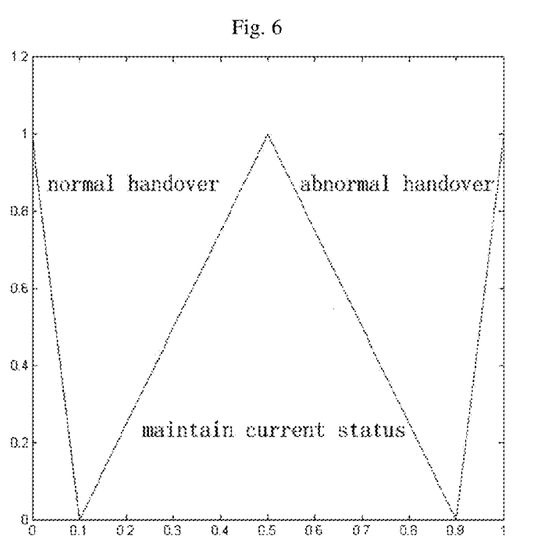
FIG. 6 is a schematic diagram of fuzzification results of three handover modes of the mobile station on the basis of the wireless local area network handover method based on fuzzy rules according to the present invention.

The mobile station determines levels of signal strength of the current access point and the adjacent access point and levels of change rate of signal strength according to fuzzification data, and invokes fuzzy rules database to perform fuzzy reasoning in order to make decisions. The fuzzy rules database is shown in table 2; the appropriate mobile station status is selected based on signal strength and change rate of both the current access point and the adjacent access point. FIG. 6 is the membership function diagram of the mobile station status after fuzzy processing, which is also the output of fuzzy reasoning.

TABLE 2

| Signal intensity of the current access point | Change rate of the signal intensity of the current access point | Signal intensity of the adjacent access point | Change rate of the signal intensity of the adjacent access point | |
|---|---|---|---|---|
| Low | Steady | Low | Plummeting | Normal Handover |
| Low | Steady | Low | Steady | Normal Handover |
| Low | Steady | Low | Leap | Normal Handover |
| Low | Steady | Medium | Plummeting | Normal Handover |
| Low | Steady | Medium | Steady | Normal Handover |
| Low | Steady | Medium | Leap | Normal Handover |
| Low | Steady | High | Plummeting | Normal Handover |
| Low | Steady | High | Steady | Normal Handover |
| Medium | Plummeting | Low | Steady | Maintain Current Status |
| Medium | Plummeting | Low | Leap | Abnormal Handover |
| Medium | Plummeting | Medium | Plummeting | Maintain Current Status |
| Medium | Plummeting | Medium | Steady | Abnormal Handover |
| Medium | Plummeting | Medium | Leap | Abnormal Handover |
| Medium | Plummeting | High | Plummeting | Maintain Current Status |
| Medium | Plummeting | High | Steady | Abnormal Handover |
| Medium | Steady | Low | Plummeting | Maintain Current Status |
| Medium | Steady | Low | Steady | Maintain Current Status |
| Medium | Steady | Low | Leap | Maintain Current Status |
| Medium | Steady | Medium | Plummeting | Maintain Current Status |
| Medium | Steady | Medium | Steady | Maintain Current Status |
| Medium | Steady | Medium | Leap | Maintain Current Status |
| Medium | Steady | High | Plummeting | Maintain Current Status |
| Medium | Steady | High | Steady | Maintain Current Status |
| Medium | Leap | Low | Plummeting | Maintain Current Status |
| Medium | Leap | Low | Steady | Maintain Current Status |
| Medium | Leap | Low | Leap | Maintain Current Status |
| Medium | Leap | Medium | Plummeting | Maintain Current Status |
| Medium | Leap | Medium | Steady | Maintain Current Status |
| Medium | Leap | Medium | Leap | Maintain Current Status |
| Medium | Leap | High | Plummeting | Maintain Current Status |
| Medium | Leap | High | Steady | Maintain Current Status |
| High | Plummeting | Low | Plummeting | Maintain Current Status |
| High | Plummeting | Low | Steady | Normal Handover |
| High | Plummeting | Low | Leap | Abnormal Handover |
| High | Plummeting | Medium | Plummeting | Maintain Current Status |
| High | Plummeting | Medium | Steady | Abnormal Handover |
| High | Plummeting | Medium | Leap | Abnormal Handover |
| High | Plummeting | High | Plummeting | Normal Handover |
| High | Plummeting | High | Steady | Normal Handover |
| High | Steady | Low | Plummeting | Maintain Current Status |
| High | Steady | Low | Steady | Maintain Current Status |
| High | Steady | Low | Leap | Maintain Current Status |
| High | Steady | Medium | Plummeting | Maintain Current Status |
| High | Steady | Medium | Steady | Maintain Current Status |
| High | Steady | Medium | Leap | Maintain Current Status |
| High | Steady | High | Plummeting | Maintain Current Status |
| High | Steady | High | Steady | Maintain Current Status |

The language variables of fuzzy reasoning outputs are designated as the current status, normal handover, and abnormal handover respectively. The trigonometric function is selected to describe member functions of output variables, as shown below; there are three important parameters {r, s, t}.

$$\text{triangle}(x, r, s, t) = \begin{cases} 0 & x \leq r \\ \dfrac{x-r}{s-r} & r \leq x \leq s \\ \dfrac{t-x}{t-s} & s \leq x \leq t \\ 0 & t \leq x \end{cases} \quad (2)$$

wherein, x is an independent variable meaning the range of signal strength, herein it is set as [0, 1].

Table 3 shows the range of three language variables of membership functions of fuzzy reasoning outputs.

TABLE 3

| MF Parameters Range | Language Variables | | |
|---|---|---|---|
| | Normal Handover | Maintain Current Status | Abnormal Handover |
| r | [−0.5 −0.2] | [0 0.25] | [0.8 1] |
| s | [−0.1 0.05] | [0.45 0.65] | [0.9 1.2] |
| t | [0.05 0.2] | [0.8 1] | [1.2 1.5 |

The mobile station automatically adjusts its status after obtaining control decisions, if the output of fuzzy reasoning is to maintain the current status, the mobile station does not make any adjustment.

Figure 7:
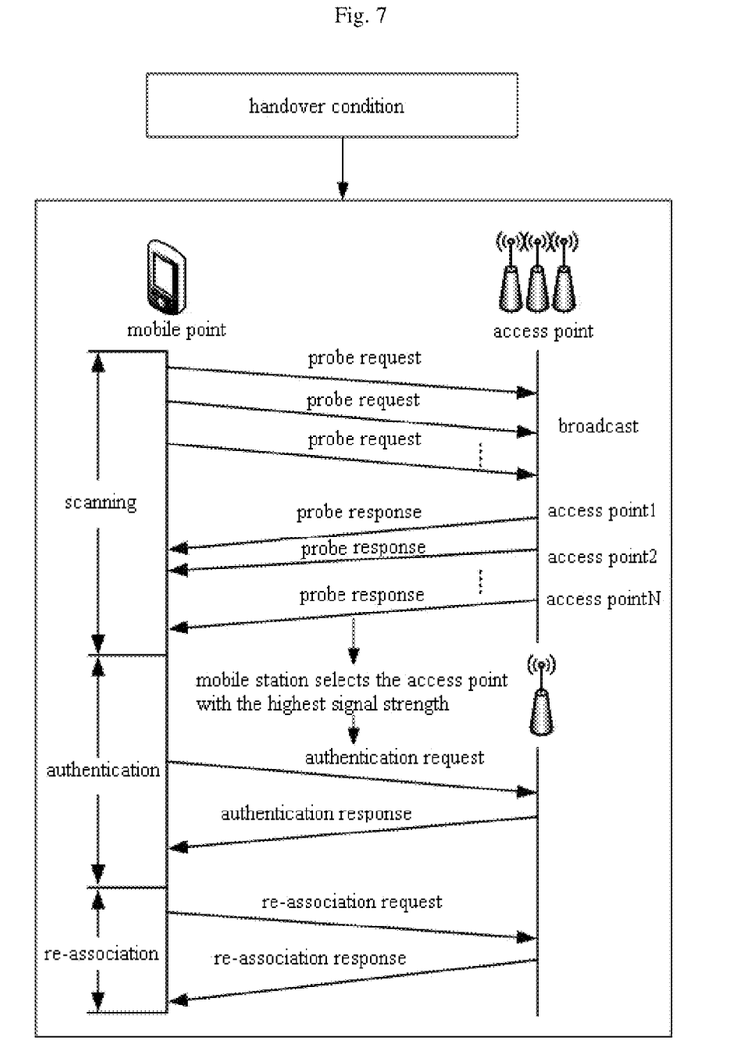
FIG. 7 is a flow chart of the normal handover state of the wireless local area network handover method based on fuzzy rules according to the present invention.

If the output of reasoning is normal handover, the process is as shown in FIG. 7. i.e., the mobile station switches to active scanning mode, sends the probe request frame, and waits for the probe response frame. If the mobile station receives probe response frames from more than one access point, it selects the access point with the highest signal strength as the target access point, before entering the authentication phase and re-association phase; If probe response frame received by the mobile station is from only one access point of which the signal strength is higher than the handover threshold, it enters the authentication phase and re-association phase; If no response frame is received, it continues scanning.

Figure 8:
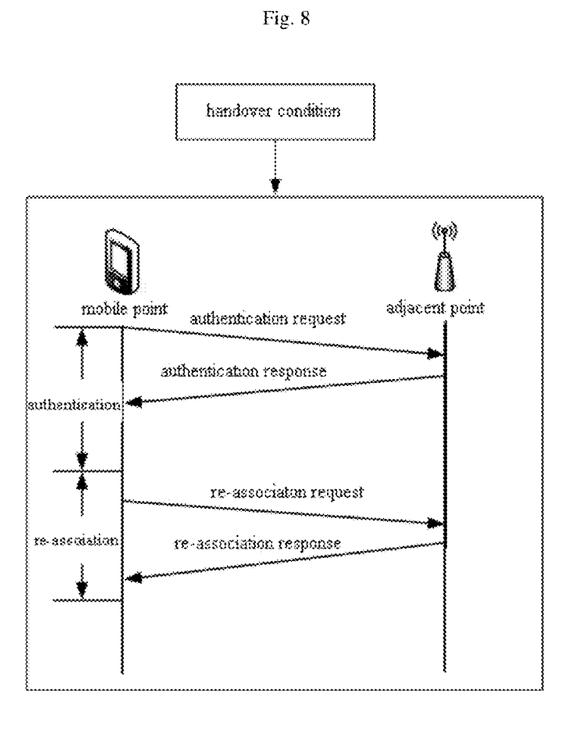
FIG. 8 is a flow chart of the abnormal handover state of the wireless local area network handover method based on fuzzy rules according to the present invention.

If the output of reasoning is abnormal handover, the process is as shown in FIG. 8. Since 90% of the handover delay is caused by scanning, in this case, the mobile station authenticates and re-associates with the adjacent access point directly, thus it could avoid longer handover delay caused by long scanning time.

The embodiments above should be considered to describe the present invention only, not to limit the present invention. Technical staff involved with the relevant area can make various changes in form but not contrary to the spirit and the scope of the present invention, thus all the equivalent technical solutions shall also belong to the scope of the present invention, and the scope of the invention should by defined by the claims.

Industrial Applicability

According to the technical solutions of the present invention, the mobile station may achieve better handover performance using fuzzy rules self-adapt handover mechanism according to signal strength and its change rate of the current access point and adjacent access points; especially in the abnormal handover mode, the mobile station authenticates and re-associates with the adjacent access point directly, to avoid longer handover delay caused by long scanning time. Therefore, the present invention is of industrial applicability.

What is claimed is:

1. A wireless local area network handover method based on fuzzy rules, wherein the method comprises:
    S1: a mobile station receives probe frames sent in predefined time interval from a current associated access point and an adjacent access point during a preset time period, then the mobile station obtains and stores at least one signal strength of the current associated access point and at least one signal strength of the adjacent access point;
    S2: the mobile station performs fuzzy processing of the at least one signal strength of the current associated access point, the at least one signal strength of the adjacent access point, a change rate of signal strength of the current associated access point during the preset time period, a change rate of signal strength of the adjacent access point during the preset time period, respectively via fuzzy control method, and obtains fuzzy data that characterizes levels of the signal strength and levels of the change rate of signal strength;
    S3: the mobile station performs fuzzy reasoning taking the fuzzy data as input variables according to an organized collection of fuzzy rules, obtains reasoning outputs that contain handover modes of the mobile station based on the fuzzy reasoning, and determines a target access point according to at least one of the reasoning outputs, wherein the reasoning outputs are designated as current status, normal handover, and abnormal handover;
    S4: the mobile station authenticates with the target access point, based on at least one of the handover modes contained in the reasoning outputs;
    S5: the mobile station sends a re-association request frame to the target access point after the mobile station has authenticated with the target access point, wherein the handover method is completed after the mobile station receives a re-association response frame from the target access point.

2. A wireless local area network handover method based on fuzzy rules according to claim 1, wherein, operation S2 further comprises:
    the mobile station identifies the signal strength of the current associated access point, the signal strength of the adjacent access point, the change rate of signal strength of the current associated access point during the preset time period, the change rate of signal strength of the adjacent access point during the preset time period as different levels respectively, via a first membership function.

3. A wireless local area network handover method based on fuzzy rules according to claim 2, wherein, the first membership function is:

$$\text{trapezoid}(x; a, b, c, d) = \begin{cases} 0 & x \leq a \\ \dfrac{x-a}{b-a} & a \leq x \leq b \\ 1 & b \leq x \leq c \\ \dfrac{d-x}{d-c} & c \leq x \leq d \\ 0 & d \leq x \end{cases}$$

wherein, for the signal strength, x is an independent variable that refers to a range of values of the signal strength;

wherein, for the change rate of signal strength, x is an independent variable that refers to a range of values of the change rate of signal strength;

wherein each of a, b, c, and d refers to a unique set of values that are constant;

wherein each of a, b, c, and d are used to determine one or more characteristics of the first membership function; and wherein the one or more characteristics of the first membership function are used, by the mobile station, to identify the different levels.

4. A wireless local area network handover method based on fuzzy rules according to claim 1, wherein, the organized collection of fuzzy rules comprises:

determining handover modes of the mobile station through a second membership function; the second membership function is:

$$\text{triangle}(x, r, s, t) = \begin{cases} 0 & x \le r \\ \frac{x-r}{s-r} & r \le x \le s \\ \frac{t-x}{t-s} & s \le x \le t \\ 0 & t \le x \end{cases}$$

wherein x is an independent variable that refers to the levels of the signal strength;

wherein each of r, s, and t refers to a unique set of values that are constant;

wherein each of r, s, and t are used to determine one or more characteristics of the second membership function; and wherein the one or more characteristics of the second membership function are used, by the mobile station, to determine the handover modes.

5. A wireless local area network handover method based on fuzzy rules according to claim 1, wherein the reasoning output of current status directs the mobile station to:

maintain the current associated access point; and
not select a target access point.

6. A wireless local area network handover method based on fuzzy rules according to claim 1, wherein the reasoning output of normal handover directs the mobile station to:

switch to an active scanning mode,
send a probe request frame,
wait for a probe response frame,
    wherein if the mobile station does not receive a probe response frame, the mobile station continues the active scanning mode;
    wherein if the mobile station receives one or more probe response frames from only one access point and the signal strength of the only one access point is higher than a handover threshold, then the mobile station selects the only one access point as the target access point; and
    wherein if the mobile station receives probe response frames from two or more access points, then the mobile station selects one access point from the two or more access points as the target access point,
        wherein the selected access point is the access point of the two or more access points that has a highest signal strength, and
        wherein the highest signal strength is determined based on at least one of:
            the signal strength of each of the two or more access points, and
            the change rate of signal strength of each of the two or more access points.

7. A wireless local area network handover method based on fuzzy rules according to claim 1, wherein the reasoning output of abnormal handover directs the mobile station to:

select the adjacent access point as the target access point, without switching to an active scanning mode or a passive scanning mode as required by a traditional handover.

8. A wireless local area network handover method based on fuzzy rules according to claim 1, wherein the change rate of signal strength of the current associated access point during the preset time period is determined prior to the mobile station performing fuzzy processing of the change rate of signal strength of the current associated access point, and wherein the determination of the change rate of signal strength of the current associated access point comprises:

the mobile station receiving a first probe frame of the current associated access point at a first time, wherein the first time is within the preset time period;

the mobile station obtaining and storing a first signal strength RSSI of the current associated access point, the first signal strength RSSI corresponding to the first probe frame that was received at the first time;

the mobile station receiving a second probe frame of the current associated access point at a second time, wherein the second time is obtained by adding the first time to the predefined time interval;

the mobile station obtaining and storing a second signal strength RSSI of the current associated access point, the second signal strength RSSI corresponding to the second probe frame that was received at the second time;

the mobile station calculating the difference between the first signal strength RSSI and the second signal strength RSSI; and the mobile station storing the difference as the change rate of signal strength of the current associated access point.

9. A wireless local area network handover method based on fuzzy rules according to claim 1, wherein the change rate of signal strength of the adjacent access point during the preset time period is determined prior to the mobile station performing fuzzy processing of the change rate of signal strength of the adjacent access point, and wherein the determination of the change rate of signal strength of the adjacent access point comprises:

the mobile station receiving a first probe frame of the adjacent access point at a first time, wherein the first time is within the preset time period;

the mobile station obtaining and storing a first signal strength RSSI of the adjacent access point, the first signal strength RSSI corresponding to the first probe frame that was received at the first time;

the mobile station receiving a second probe frame of the adjacent access point at a second time, wherein the second time is obtained by adding the first time to the predefined time interval;

the mobile station obtaining and storing a second signal strength RSSI of the adjacent access point, the second signal strength RSSI corresponding to the second probe frame that was received at the second time;

the mobile station calculating the difference between the first signal strength RSSI and the second signal strength RSSI; and the mobile station storing the difference as the change rate of signal strength of the adjacent access point.

* * * * *